United States Patent
Jones et al.

(10) Patent No.: US 9,704,124 B2
(45) Date of Patent: Jul. 11, 2017

(54) METHOD AND APPARATUS PERTAINING TO MONITORING ITEM SOURCE LOCATIONS

(71) Applicant: Wal-Mart Stores, Inc., Bentonville, AR (US)

(72) Inventors: Nicholaus A. Jones, Fayetteville, AR (US); Bruce W. Wilkinson, Rogers, AR (US)

( * ) Notice: Subject to any disclaimer, the term of this patent is extended or adjusted under 35 U.S.C. 154(b) by 346 days.

(21) Appl. No.: 13/804,772

(22) Filed: Mar. 14, 2013

(65) Prior Publication Data

US 2014/0266616 A1 Sep. 18, 2014

(51) Int. Cl.
| | |
|---|---|
| *G06Q 10/08* | (2012.01) |
| *G06Q 30/02* | (2012.01) |
| *G06Q 10/06* | (2012.01) |
| *G06K 17/00* | (2006.01) |
| *G08B 13/24* | (2006.01) |

(52) U.S. Cl.
CPC ........... *G06Q 10/087* (2013.01); *G06Q 10/06* (2013.01); *G06Q 10/08* (2013.01); *G06Q 30/02* (2013.01); *G06K 2017/0045* (2013.01); *G08B 13/2417* (2013.01)

(58) Field of Classification Search
CPC ...... G06Q 10/08; G06Q 10/087; G06Q 10/06; G06Q 30/02; G08B 13/2417; G06K 2017/0045
USPC .......................... 340/572.1; 705/28; 700/215
See application file for complete search history.

(56) References Cited

U.S. PATENT DOCUMENTS

| | | | |
|---|---|---|---|
| 6,026,378 A | 2/2000 | Onozaki | |
| 6,496,806 B1 | 12/2002 | Horwitz | |
| 6,684,980 B2 * | 2/2004 | Hungerford, III | 186/52 |
| 6,897,763 B2 * | 5/2005 | Schulmerich et al. | 340/5.91 |
| 7,243,001 B2 * | 7/2007 | Janert et al. | 700/214 |
| 7,347,361 B2 | 3/2008 | Lovett | |

(Continued)

FOREIGN PATENT DOCUMENTS

| | | |
|---|---|---|
| WO | 2014159978 | 10/2014 |
| WO | 2014160325 | 10/2014 |
| WO | 2014160365 | 10/2014 |

OTHER PUBLICATIONS

EPCglobal; 'EPC(TM) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages, Jan. 2005.

(Continued)

*Primary Examiner* — Mohamed Barakat
(74) *Attorney, Agent, or Firm* — Fitch Even Tabin & Flannery LLP

(57) ABSTRACT

One maintains a first historical record that correlates each of a plurality of items that each have a unique identifier with one of a plurality of locations with a facility. Upon then determining that a given one of those items is leaving the facility (for example, by detecting that the item is literally exiting a building that comprises the facility and/or that the item is being purchased), that item's unique identifier and that first historical record are used to update a second historical record with respect to which locations within the facility are moving which items. By one approach the aforementioned unique identifier can comprise an electronic product code as comprises a part of a corresponding RFID tag.

10 Claims, 2 Drawing Sheets

(56) References Cited

U.S. PATENT DOCUMENTS

| | | | |
|---|---|---|---|
| 7,486,188 B2* | 2/2009 | Van Alstyne | 340/572.1 |
| 7,543,741 B2 | 6/2009 | Lovett | |
| 7,810,720 B2 | 10/2010 | Lovett | |
| 8,077,041 B2* | 12/2011 | Stern et al. | 340/572.1 |
| 8,102,264 B2 | 1/2012 | Rinkes | |
| 8,120,469 B2* | 2/2012 | Adamee et al. | 340/10.2 |
| 8,154,408 B2 | 4/2012 | Spindel | |
| 8,321,302 B2 | 11/2012 | Bauer | |
| 8,321,303 B1 | 11/2012 | Krishnamurthy | |
| 8,332,656 B2* | 12/2012 | Jones et al. | 713/189 |
| 8,669,915 B2 | 3/2014 | Wilkinson | |
| 8,988,199 B1 | 3/2015 | Moretti | |
| 9,123,016 B2 | 9/2015 | Jones | |
| 9,310,466 B2 | 4/2016 | Jones | |
| 2005/0021561 A1 | 1/2005 | Noonan | |
| 2007/0073513 A1 | 3/2007 | Posamentier | |
| 2007/0090951 A1 | 4/2007 | Chan | |
| 2008/0100445 A1* | 5/2008 | Horwitz et al. | 340/572.1 |
| 2008/0129513 A1 | 6/2008 | Bielas | |
| 2008/0150692 A1 | 6/2008 | Missimer | |
| 2008/0319575 A1 | 12/2008 | Vahlberg | |
| 2009/0101712 A1* | 4/2009 | Ulrich et al. | 235/383 |
| 2009/0231135 A1 | 9/2009 | Chaves | |
| 2009/0295582 A1 | 12/2009 | Sawyer | |
| 2010/0148985 A1 | 6/2010 | Lin | |
| 2010/0164694 A1 | 7/2010 | Matsubara | |
| 2011/0090062 A1 | 4/2011 | Hofer | |
| 2011/0276382 A1 | 11/2011 | Ramchandani | |
| 2012/0086553 A1 | 4/2012 | Wilkinson | |
| 2012/0086554 A1 | 4/2012 | Wilkinson | |
| 2012/0161967 A1 | 6/2012 | Stern | |
| 2012/0161968 A1 | 6/2012 | Bodapati | |
| 2012/0235817 A1 | 9/2012 | Forster | |
| 2013/0027191 A1 | 1/2013 | Wilkinson | |
| 2013/0093591 A1 | 4/2013 | Campero | |
| 2014/0035724 A1 | 2/2014 | Rothschild | |
| 2014/0266608 A1 | 9/2014 | Jones | |
| 2014/0266615 A1 | 9/2014 | Ouyang | |
| 2014/0266616 A1 | 9/2014 | Jones | |
| 2014/0266618 A1 | 9/2014 | Jones | |

OTHER PUBLICATIONS

PCT; App. No. PCT/US2014/026397; International Search Report mailed Jul. 18, 2014.

PCT; App. No. PCT/US2014/026397; Written Opinion mailed Jul. 18, 2014.

U.S. Appl. No. 13/803,765, filed Mar. 14, 2013, Ouyang.

U.S. Appl. No. 13/826,302, filed Mar. 14, 2013, Jones.

U.S. Appl. No. 13/826,442, filed Mar. 14, 2013, Jones.

PCT; App. No. PCT/US2014/026397; International Preliminary Report on Patentability mailed Sep. 24, 2015.

\* cited by examiner

METHOD AND APPARATUS PERTAINING TO MONITORING ITEM SOURCE LOCATIONS

TECHNICAL FIELD

This invention relates generally to item tracking.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.)

Many retail facilities offer identical items at more than one location within their facility. As one common example in these regards, a given item can be offered at a loose-inventory display (such as on a shelf) and also at a pre-stocked retail display (such as a so-called end cap) located elsewhere in the facility. It can be useful to understand how commercially successful varying locations and display strategies for a given product are with respect to one another. Unfortunately, typical monitoring of in-store merchandise via RFID tags often fails to offer such insight.

BRIEF DESCRIPTION OF THE DRAWINGS

The above needs are at least partially met through provision of the method and apparatus pertaining to monitoring item source locations described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, one maintains a first historical record that correlates each of a plurality of items that each have a unique identifier with one of a plurality of locations with a facility. Upon then determining that a given one of those items is leaving the facility (for example, by detecting that the item is literally exiting a building that comprises the facility and/or that the item is being purchased), that item's unique identifier and that first historical record are used to update a second historical record with respect to which locations within the facility are moving which items. By one approach the aforementioned unique identifier can comprise an electronic product code as comprises a part of a corresponding RFID tag.

By one approach these teachings are carried out without requiring constant (or even frequent) communications between the item's RFID tag and the facility's RFID-tag reader system. The second historical record, in turn, permits interested authorized associates to process, sort, search, and otherwise utilize reliable information regarding which locations are particularly effective (or ineffective) to encourage the sales of particular goods. By including time stamp information in the second historical record (comprising the time of day and/or the day itself) such insights can be further refined and/or elaborated upon by including a temporal dimension to such reports. Such information, in turn, can help the facility operator to best position their items and can also help to inform the content, design, timing, and location of pre-stocked retail displays.

Figure 1:
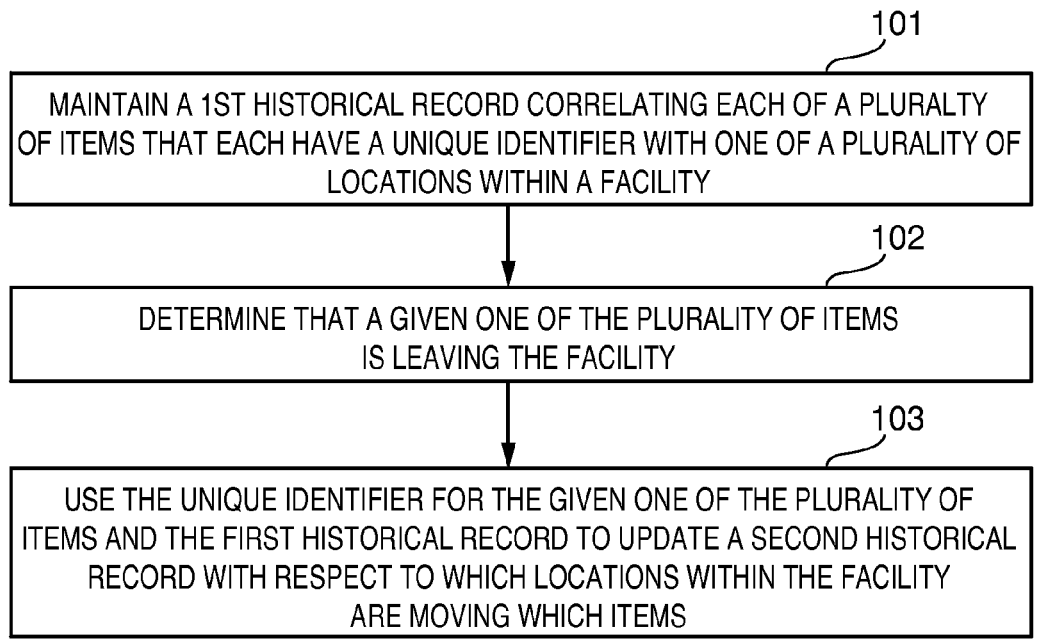
FIG. 1 comprises a flow diagram as configured in accordance with various embodiments of the invention.

These and other benefits may become clearer upon making a thorough review and study of the following detailed description. Referring now to the drawings, and in particular to FIG. 1, an illustrative process 100 that is compatible with many of these teachings will now be presented.

At 101 this process 100 provides for maintaining a first historical record that correlates each of a plurality of items that each have a unique identifier with one of a plurality of locations within a facility. For the sake of illustration but without intending any limitations in these regards some or all of the items can comprise items that are offered for sale at retail and the aforementioned facility can comprise a retail-sales facility (such as, but not limited to, a so-called department store, a so-called big box store, or a specialty store where the facility itself may comprise a stand-alone building or may be attached to or otherwise comprise a part of a larger building such as a mall or other type of shopping center).

These items can all be commercially identical to one another (where, for example, each item shares a same stock-keeping unit (SKU) number) if desired. In many application settings, however, some of the items will be identical to one another while other items are different. By way of illustration, three of the items might each comprise a same particular size of a particular style of a particular brand of jeans while another ten of the items might each comprise a same-sized box of the same brand and type of cake mix. The present teachings are highly scalable in these regards and these teachings will readily accommodate an application setting having tens or even hundreds of thousands of differing items or more.

By one approach, each of these items has a corresponding RFID tag. The RFID tag may be attached, for example, to the packaging of the item, or may be a part of that packaging. It is also possible for the RFID tag to be permanently or removably directly attached to the item itself (for example, by use of a suitable adhesive). If desired, the aforementioned unique identifier comprises an electronic product code such as the aforementioned EPC. In that case, the unique identifier is "unique" within the context of a numbering scheme that is established and maintained pursuant to that standard.

The aforementioned locations can of course vary with the application setting. By one approach, and by way of a non-limiting example, one such location can comprise a loose-inventory display for a given item while another such location can comprise one or more pre-stocked retail displays that include at least one of the same given item. A loose inventory display can assume any of a variety of form factors and designs. Examples include but are not limited to shelves of items, peg-based displays of items, open floor space displays, and so forth. Generally speaking, "loose inventory" as used herein refers to any of a variety of display modalities other than a pre-stocked retail display.

A "pre-stocked retail display," in turn, comprises a display that arrives at the facility with a previously-stocked selection of items. The display, upon arrival, may be complete in and of itself or it may require joinder in some manner with another pre-stocked retail display in order to constitute a complete display. Such a pre-stocked retail display may include only a single type of item but in many useful application settings includes a variety of items. By way of illustration, a pre-stocked retail display intended for use in conjunction with a given upcoming holiday can include a variety of different food items that are associated with observance of that holiday.

Generally speaking, items are displayed in such a facility pursuant to a plan and other than randomly (at least for the most part). Accordingly, at least for certain periods of time, items of a particular kind are assigned to be displayed in a specific place in the store. This place may or may not be specified down to the inch but will often, at the least, identify the location within, say, five feet, ten feet, or the like. This includes both loose-inventory items as well as pre-stocked retail displays that include such items.

There are various ways by which the referred-to first historical record can be built, maintained, and updated. One such approach can be found in U.S. patent application Ser. No. 13/826,302 entitled METHOD AND APPARATUS PERTAINING TO THE USE OF GROUP RFID TAG INFORMATION and filed on even date herewith (the entire contents of which are hereby fully incorporated herein by this reference). By another approach, in lieu of the foregoing or in combination therewith, associates can use handheld optical code scanners (such as Universal Product Code barcode scanners) and/or handheld RFID-tag readers from time to time as desired to conduct inventory audits of part or all of the facility to determine what is where. By yet a further approach, an in-facility set of distributed RFID-tag readers can serve to detect when a given RFID-tag moves from one location to another. In such a case, the first historical record can be updated when and as such movements are detected. As the present teachings are not overly sensitive to any particular approach in these regards, for the sake of brevity further elaboration here in these regards will not be presented.

That first historical record can be maintained, for example, in a digital memory. An illustrative example in these regards is shown further below. The record itself can be temporally comprehensive, if desired, and reflect the entire history of the facility. By another approach the first historical record can be updated from time to time in ways that include purging previously-entered information and/or updating that information to reflect subsequent events and/or circumstances.

At 102 this process 100 provides for determining that a given one of the plurality of items is leaving the facility. (As used herein, the expression "is leaving" will be understood to include the immediate past tense (for example, within one minute, five minutes, ten minutes or the like of when the item actually physically leaves the facility), the present tense (i.e., the moment when the item actually physically leaves the facility), and/or the immediate future tense (for example, within five seconds, tens seconds, thirty seconds or the like following when the item actually physically leaves the facility).

Accordingly, this determination can be based, for example, upon detecting that the given item is presently exiting a building that comprises the facility. Such a determination might be based, for example, upon inputs from one or more RFID-tag readers that are located and configured to read the item's RFID tag as that RFID tag passes through an exit portal or pathway for the facility.

As another example, this determination can be based upon detecting that the given item has been purchased. Such a determination might be based, for example, upon inputs from one or more RFID-tag readers that are located and configured to read the item's RFID tag as that RFID tag passes through a point-of-sale station for the facility. (As used herein, the expression "has been purchased" will be understood to include circumstances where the item is likely being purchased and hence can include detecting that the item is in a point-of-sale area without necessarily also confirming the actual consummation of a legal change of ownership of the item based upon a transfer of consideration such as a payment of a purchase price using cash, credit, a gift or debit card, and so forth.

Generally speaking, although this determination 102 may be informed by one or more general indications that the item is leaving the facility (for example, an optical scanner at the point-of-sale may provide information that an item that is categorically the same as the given item has been purchased), this determination 102 can be particularly based upon the aforementioned unique identifier as corresponds to the given item. As exemplified in the illustrative examples provided above, reading the RFID tag for the given item provides one useful and convenient way to obtain the EPC that includes such a unique identifier.

At 103, this process 100 then provides for using the item's unique identifier in combination with the aforementioned first historical record to update a second historical record with respect to which locations within the facility are moving which items. (As used herein, this reference to a "second" historical record will be understood to refer to either a physical arrangement (in which case the second historical record can be physically separate and discrete from the first historical record) and/or a logical arrangement (in which case these teachings will accommodate the first and second historical records comprising a shared historical record).)

For example, upon determining that a given item having the unique identifier 12345678 is leaving the facility, this process 100 can provide for using that unique identifier to access the first historical record to access information regarding the previously-determined location for that given item (for example, a loose-inventory display location or a pre-stocked retail display location). The second historical record then serves as a database that correlates sales with locations from which the sold items were selected by the purchaser.

By one approach this second historical record can retain an individual record in these regards for each and every sold item (either comprehensively or at least over some predetermined window of time such as one month, one year, five years, or other duration of interest). In this case the second historical record can also include, if desired, a time stamp as part of each individual record. So configured, such information can be sorted and searched to provide reports, for example, regarding whether certain kinds of end-cap displays are more successful at certain times of the year.

By another approach, in lieu of the foregoing or in combination therewith, this second historical record can retain an aggregated view in these regards. This aggregated view might store the aforementioned location/sales information, for example, on a SKU-level basis rather than on an individual EPC-level basis. Such an approach would permit generating reports with a SKU-level view but would not necessarily support a view offering any finer granularity. Such a report, of course, could be fashioned to meet the needs of a particular user. It might be sufficient, for example, to know that over a given quarter-year period forty-five percent of all sales for a given item involved items that were selected by the purchaser from pre-stocked retail displays. In other cases such a report could include considerably more information (including, for example, information regarding the total number of such items that were sold, what percentage of all displayed items were eventually sold while so located, whether end cap displays were more successful than loose-inventory displays when the item at issue is offered for a sale price, and so forth).

Figure 2:
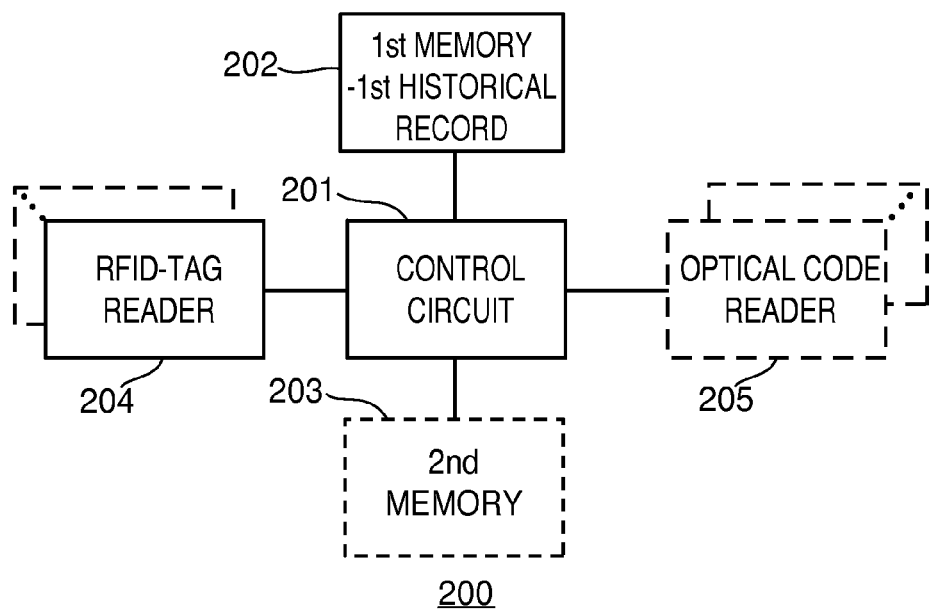
FIG. 2 comprises a block diagram as configured in accordance with various embodiments of the invention.

The above-described processes are readily enabled using any of a wide variety of available and/or readily-configured platforms, including partially or wholly programmable platforms as are known in the art or dedicated purpose platforms as may be desired for some applications. Referring now to FIG. 2, an illustrative approach to such an apparatus 200 will now be provided.

In this illustrative example the apparatus 200 includes a control circuit 201 that operably couples to a first memory 202 that serves, at the least, to store the aforementioned first historical record. Such a control circuit 201 can comprise a fixed-purpose hard-wired platform or can comprise a partially or wholly programmable platform. It will also be understood that this control circuit 201 can comprise, if desired, a single physical platform or can comprise a plurality of interconnected components. All of these architectural options are well known and understood in the art and require no further description here. This control circuit 201 is configured (for example, by using corresponding programming as will be well understood by those skilled in the art) to carry out one or more of the steps, actions, and/or functions described herein.

The first memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

In addition to storing the aforementioned first historical record, this first memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

As described above, the aforementioned second memory can be one and the same with the first memory, in whole or in part, as desired. These teachings will also accommodate, however, employing an optional second memory 203 that also operably couples to the control circuit 201 in this illustrative example.

One or more RFID-tag readers 204 can operably couple to the control circuit 201 to support one or more of the aforementioned activities. Such RFID-tag readers 204 can serve, for example, to facilitate developing the aforementioned first historical record and can also facilitate determining that a given item is leaving the facility. (These teachings will also accommodate, if desired, using a different RFID-tag reader/control circuit arrangement to build the first historical record. In that case, the apparatus 200 can include some communication pathway between the first memory 202 and that other arrangement to provide a way to deliver and maintain the information that comprises the first historical record.)

Somewhat similarly, one or more optical code readers 205 can also optionally couple to the control circuit 201. These optical code readers 205 can provide information that helps to maintain the first historical record and/or that provides an indication of when a particular category of item is being purchased, and so forth as desired.

Figure 3:
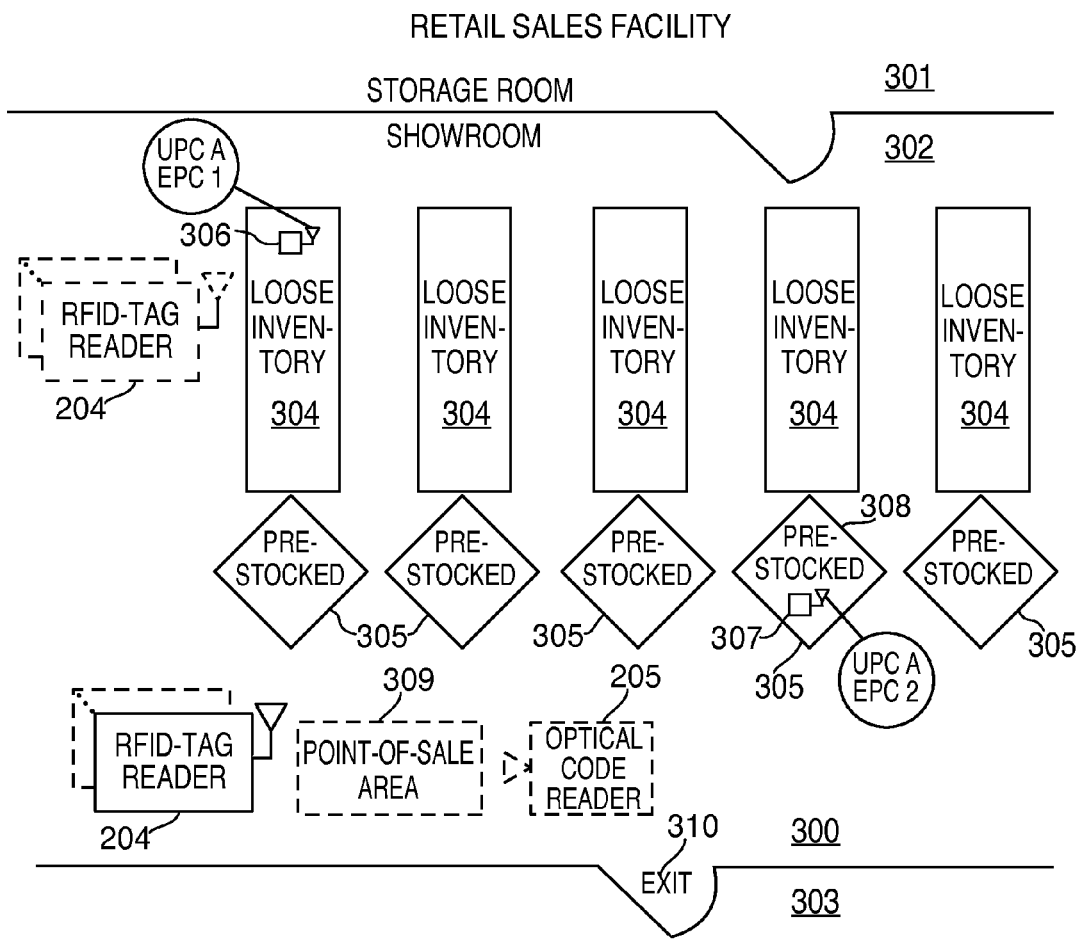
FIG. 3 comprises a top plan schematic view as configured in accordance with various embodiments of the invention.

FIG. 3 provides another illustrative example in these regards. It will be understood that no particular limitations are intended by way of the specificity of this example.

FIG. 3 presents a view of a portion of a given facility 300. This facility 300 is a retail-sales facility having a storage room 301 and a showroom 302. The storage room 301 serves, at least in part, to receive and store items that are intended for eventual placement in the showroom 302. The showroom 302, in turn, serves as a place where items are displayed and available for selection and purchase by customers of the facility 300. In this particular example the facility 300 abuts an external area 303 such as a parking lot, a sidewalk, a shopping mall common area, or the like.

The showroom 302 includes a plurality of shelves 304 where items are displayed as loose inventory. The showroom 302 also includes a plurality of pre-stocked retail displays 305 that happen, in this illustrative example, to each be positioned at one end of a given shelf 304.

For the sake of an example, a first item 306 is located as loose inventory on one of the shelves 304 and another item 307 is located at a particular one 308 of the pre-stocked retail displays 305. These items 306 and 307 are categorically the same and hence have the same SKU (represented here as "UPC A"). Accordingly, in this example, a same kind of item is stocked and displayed in two separate locations of the facility 300. Each of these items 306 and 307 has a corresponding EPC RFID tag. Accordingly, each item 306 and 307 has a corresponding unique identifier (represented here as "EPC 1" for one of the items 306 and "EPC 2" for the other item 307).

Per these teachings the above-mentioned first historical record includes information that places the first-mentioned item 306 at a first location corresponding to the loose-inventory location and the second-mentioned item 307 at a second location corresponding to the pre-stocked retail display 308. By one approach, for example, this information may have been initially gleaned using information provided by RFID-tag readers 204 that are appropriately located to read such RFID tags.

When a customer eventually selects one of these two items 306 and 307 for purchase, the customer takes the selected item to a point-of-sale area 309 where a facility associate prepares a record of sale and where the customer makes a corresponding payment. The aforementioned RFID-tag reader(s) 204 (alone or in conjunction with one or more of the aforementioned optical code readers 205) are configured, in this example, to detect the presence of the selected item (via the RFID tag that corresponds to the selected item) and to pass that information (including the unique EPC identifier) to the aforementioned control circuit 201.

In lieu of the foregoing, or in combination therewith as desired, one or more RFID-tag readers 204 can be positioned and configured to read RFID tags for purchased items as the customer leaves the facility 300 with those items via a corresponding exit 310. Or, by yet another approach (and again in lieu of the foregoing or in combination therewith), the point-of-sale area 309 can include an optical scanner that serves to read an optical code (such as, by way of example, a GS1-128-compliant optical code) for the item being purchased that contains identifying information such as the aforementioned EPC unique identifier and that again passes that information to the control circuit 201.

Per the described process, the resultant second historical record provides the facility operator with information regarding which locations of the facility 300 are moving which items. In the particular example just described, the second historical record will reflect whether the selected item was the item 306 that had been located in the loose-inventory location or the item 307 that had been displayed as part of the pre-stocked retail display 308.

Such information, in turn, can be leveraged in a variety of ways to help the facility operator better understand and plan their store layouts and the contents, design, and timing of their pre-stocked retail displays. The foregoing can result in better sales as well as a more productive and efficient shopping experience for the consumer.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept. As one example in these regards, in the illustrative examples provided above the locations were actual physical locations within the facility. These teachings will also accommodate treating "locations" as logical locations rather than physical locations. For example, it may suffice to simply differentiate between loose-inventory displays as one kind of location and pre-stocked retail displays as another kind of location without regard for where those displays are physically located within the facility. In this case, the logical locations can be differentiated even when a pre-stocked retail display shares a same physical location with a loose-inventory display of the same category of item.

We claim:

1. A method to indicate which of a plurality of display locations within a retail-sales facility has a greater number of displayed categorically-similar products purchased by consumers as compared to other of the plurality of display locations that also display the categorically-similar products, where each of the categorically-similar products has a radio-frequency identification (RFID) tag having a unique identifier such that each of the products can be individually identified, the method comprising:
   maintaining a first historical record correlating each of the categorically-similar products with one of the plurality of display locations within the retail-sales facility;
   determining that a given one of the categorically-similar products has been purchased by a purchaser;
   using the unique identifier for the given one of the categorically-similar products that has been purchased and the first historical record to identify from which of the plurality of display locations the purchased product was selected by the purchaser;
   updating a second historical record to indicate that the purchased product was selected from the identified display location to thereby facilitate determining which of the plurality of display locations that display similar products achieves a higher sales volume.

2. The method of claim 1 wherein the unique identifier comprises an electronic product code.

3. The method of claim 2 wherein the electronic product code comprises an electronic product code as specified by a standard denoted as EPC Radio-Frequency Identity Protocols Class-1 Generation-2 UHF RFID Protocol for Communications at 860 MHz-960 MHz Version 1.0.9.

4. The method of claim 1 wherein the plurality of display locations at least include:
   loose-inventory displays of some of the categorically-similar products; and
   at least one pre-stocked retail display of some of the categorically-similar products.

5. The method of claim 1 wherein the first historical record and the second historical record comprise a shared historical record.

6. An apparatus configured to indicate which of a plurality of display locations within a retail-sales facility has a greater number of displayed categorically-similar products purchased by consumers as compared to other of the plurality of display locations that also display the categorically-similar products, where each of the categorically-similar products has a radio-frequency identification (RFID) tag having a unique identifier such that each of the products can be individually identified, the apparatus comprising:
   a first memory having a first historical record stored therein correlating each of the categorically-similar products with one of the plurality of display locations within the retail-sales facility;
   a control circuit operably coupled to the first memory and configured to:
   determine that a given one of the categorically-similar products has been purchased by a purchaser;
   use the unique identifier for the given one of the categorically-similar products that has been purchased and the first historical record to identify from which of the plurality of display locations the purchased product was selected by the purchaser;

update a second historical record to indicate that the purchased product was selected from the identified display location to thereby facilitate determining which of the plurality of display locations that display similar products achieves a higher sales volume.

7. The apparatus of claim 6 wherein the unique identifier comprises an electronic product code.

8. The apparatus of claim 7 wherein the electronic product code comprises an electronic product code as specified by a standard denoted as EPC Radio-Frequency Identity Protocols Class-10 Generation-2 UHF RFID Protocol for Communications at 860 MHz-960 MHz Version 10.0.9.

9. The apparatus of claim 6 wherein the plurality of display locations at least include:
   loose-inventory displays of some of the categorically-similar products; and
   at least one pre-stocked retail display of some of the categorically-similar products.

10. The apparatus of claim 6 wherein the first historical record and the second historical record comprise a shared historical record.

\* \* \* \* \*